United States Patent [19]

Mamiya et al.

[11] Patent Number: 5,413,075
[45] Date of Patent: May 9, 1995

[54] GASEOUS FUEL ENGINE AND AIR-FUEL RATIO CONTROL SYSTEM FOR THE ENGINE

[75] Inventors: Kiyotaka Mamiya; Tohru Shiraishi; Katuhiro Yokomizo; Takafumi Teramoto, all of Hiroshima, Japan

[73] Assignee: Mazda Motor Corporation, Hiroshima, Japan

[21] Appl. No.: 172,894

[22] Filed: Dec. 27, 1993

[30] Foreign Application Priority Data

| Dec. 28, 1992 [JP] | Japan | 4-348364 |
| Dec. 28, 1992 [JP] | Japan | 4-348366 |
| Feb. 12, 1993 [JP] | Japan | 5-24076 |

[51] Int. Cl.⁶ .......................... F02B 43/04; F02D 41/40
[52] U.S. Cl. .................................... 123/431; 123/435; 123/527
[58] Field of Search .................. 123/27 GE, 431, 435, 123/525, 527, 526, 681, 682, 683, 684, 687

[56] References Cited

U.S. PATENT DOCUMENTS

| 4,903,665 | 2/1990 | Washino et al. | 123/435 |
| 4,913,118 | 4/1990 | Watanabe | 123/435 |
| 5,029,565 | 7/1991 | Talbot | 123/435 |
| 5,052,360 | 10/1991 | Ingle, III et al. | 123/431 |
| 5,069,185 | 12/1991 | Evasick | 123/435 |
| 5,303,684 | 4/1994 | Brown et al. | 123/435 |
| 5,313,920 | 5/1994 | Matsushita | 123/431 |
| 5,355,854 | 10/1994 | Aubee | 123/431 |

FOREIGN PATENT DOCUMENTS

| 51-034308 | 3/1976 | Japan |
| 2267309 | 11/1990 | Japan |
| 4125343 | 4/1992 | Japan |

*Primary Examiner*—Willis R. Wolfe
*Attorney, Agent, or Firm*—Sixbey, Friedman, Leedom & Ferguson; Gerald J. Ferguson, Jr.

[57] ABSTRACT

An air-fuel ratio control system for a gaseous fuel engine which runs on gaseous fuel containing at least partly hydrogen gas has a fuel supply control valve which adjusts the amount of the gaseous fuel supplied to the engine and a control unit which controls the fuel supply control valve to control the air-fuel ratio according to the engine load. The control unit controls the fuel supply control valve so that the air-fuel ratio becomes higher than a NOx-maximizing air-fuel ratio, at which the amount of NOx emitted from the engine is maximized, in a predetermined operating range of the engine, and in the predetermined operating range of the engine, the control unit controls the fuel supply control valve so that the air-fuel ratio becomes higher in a high engine speed range than in a low engine speed range.

13 Claims, 8 Drawing Sheets

GASEOUS FUEL ENGINE AND AIR-FUEL RATIO CONTROL SYSTEM FOR THE ENGINE

BACKGROUND OF THE INVENTION

1. Field of the Invention

This invention relates to a gaseous fuel engine which runs on gaseous fuel such as hydrogen gas and a air-fuel ratio control system for the engine.

2. Description of the Prior Art

Hydrocarbon fuels such as gasoline which are liquid at ordinary temperatures have been wide used as automotive fuels. However gasoline engines and diesel-engines give off various air pollutants such as $CO_2$, CO, HC, NOx and the like. Accordingly, as disclosed, for instance, in Japanese Unexamined Patent Publication No. 51(1976)-34308, there have been proposed gaseous fuel engines which run on hydrogen gas, methane gas, ethane gas or the like which produces no or a very small amount of $CO_2$, CO or HC.

However since the density of gaseous fuel is very small as compared with that of liquid fuel such as gasoline, charging efficiency cannot be sufficiently high in the gaseous fuel engine and the engine output power cannot be sufficiently increased when the fuel is supplied to an intake passage where the fuel is mixed with intake air to form an air-fuel mixture and then the air-fuel mixture is introduced into a combustion chamber as in the conventional gasoline engines (pre-mixing fuel system).

Thus there has been proposed a gaseous fuel engine provided with a direct-injection fuel system in which the gaseous fuel is directly injected into the combustion chamber under pressure from the end of the intake stroke to the beginning of the compression stroke, i.e., after a sufficient amount of air is charged in the combustion chamber, thereby improving the charging efficiency and the engine output power. See Japanese Patent Publication Nos. 1(1989)-23659, 58(1983)-12458, and the like.

However such a direct-injection fuel system is disadvantageous in that the time for which the gaseous fuel is mixed with the intake air is very short and accordingly the thermal efficiency deteriorates and fuel economy lowers.

There has been proposed a gasoline engine in which a first fuel injection valve for injecting gasoline into intake air in the intake passage and a second fuel injection valve for injecting the same into the combustion chamber are provided and the first and second fuel injection valves are selectively used according to the operating condition of the engine. See, Japanese Unexamined Patent Publication Nos. 61(1986)-244821, 61(1986)-250364, 56(1981)-151213 and the like. That is, in the gasoline engine, the air-fuel mixture burns in a limited air-fuel ratio range and accordingly the air-fuel mixture is difficult to ignite during light load operation where the air-fuel ratio is set lean. Accordingly, gasoline is injected into the combustion chamber from the second injection valve during light load operation so that rich air-fuel mixture is locally formed around the spark plug (stratification), thereby improving the ignitability of the air-fuel mixture. On the other hand, during heavy load operation, gasoline is injected into intake air in the intake passage from the first injection valve to promote mixing of gasoline and air, thereby improving the thermal efficiency and the engine output power.

When the pre-mixing fuel system is used in the gaseous fuel engine, the air-fuel mixture burns substantially quickly under the normal condition, which makes higher the combustion temperature and results in increased amount of NOx. Accordingly, when the pre-mixing fuel system and the direct-injection fuel system are used together or selectively in the gaseous fuel engine, measure must be taken to prevent NOx from increasing or to reduce the amount of NOx produced. At present, however, there has been proposed no means which can effectively suppress the amount of NOx in the gaseous fuel engine where the pre-mixing fuel system and the direct-injection fuel system are used together or selectively.

Further the gaseous fuel engine involves a problem that since hydrogen is burnt, steam is formed in the cylinder and accordingly when the engine is cold, saturated steam in the burned gas is condensed and a drop of water adheres to the spark plug and/or the cylinder wall. The drop of water adhering to the spark plug can cause misfire and prevent the engine from being started. Further the drop of water adhering to the cylinder wall can flow into the oil pun to deteriorate the oil in the pun and to cause shortage of oil.

Though, as disclosed in Japanese Unexamined Patent Publication No. 2(1989)-267309, there has been proposed a hydrogen engine in which water component is removed from the oil, such approach adds to the cost, results in increase in the engine size, and at the same time can prevent water neither from adhering to the spark plug to cause the misfire nor from flowing into the oil pun.

SUMMARY OF THE INVENTION

In view of the foregoing observations and description the primary object of the present invention is to provide a gaseous fuel engine in which both the thermal efficiency and the charging efficiency can be improved to improve the fuel economy and at the same time the amount of NOx produced can be suppressed.

Another object of the present invention is to provide an air-fuel ratio control system for a gaseous fuel engine which can effectively suppress NOx production over a wide operating range of the engine while ensuring excellent fuel economy and running performance.

Another object of the present invention is to provide an air-fuel ratio control system for a gaseous fuel engine which can prevent formation of drops of water in the cylinder even if the engine is cold.

In accordance with a first aspect of the present invention, there is provided an air-fuel ratio control system for a gaseous fuel engine which runs on gaseous fuel containing at least partly hydrogen gas comprising a fuel supply adjustment means which adjusts the amount of said gaseous fuel supplied to the engine and a control means which controls the fuel supply adjustment means to control the air-fuel ratio according to the engine load, characterized in that said control means controls said fuel supply adjustment means so that the air-fuel ratio becomes higher than a NOx-maximizing air-fuel ratio, at which the amount of NOx emitted from the engine is maximized, in a predetermined operating range of the engine, and in the predetermined operating range of the engine, the control means controls said fuel supply adjustment means so that the air-fuel ratio becomes higher in a high engine speed range than in a low engine speed range.

In accordance with a second aspect of the present invention, there is provided an air-fuel ratio control system for a gaseous fuel engine which runs on gaseous fuel containing at least partly hydrogen gas comprising a fuel supply adjustment means which adjusts the amount of said gaseous fuel supplied to the engine, a target air-fuel ratio setting means which sets a target air-fuel ratio according to the operating condition of the engine, and a control means which controls the fuel supply adjustment means so that the air-fuel ratio converges on the target air-fuel ratio set by the target air-fuel ratio setting means, characterized by having a temperature detecting means which detects the temperature of burned gas in the cylinder of the engine, a determining means which determines whether the temperature detected by the temperature detecting means is not higher than a predetermined value and an air-fuel ratio correcting means which corrects the target air-fuel ratio set by the target air-fuel ratio setting means to a higher value when the determining means determines that the temperature detected by the temperature detecting means is not higher than the predetermined value.

In accordance with a third aspect of the present invention, there is provided an air-fuel ratio control system for a gaseous fuel engine which runs on gaseous fuel containing at least partly hydrogen gas comprising a fuel supply adjustment means which adjusts the amount of said gaseous fuel supplied to the engine, a target air-fuel ratio setting means which sets a target air-fuel ratio when the engine is being started, and a control means which controls the fuel supply adjustment means so that the air-fuel ratio converges on the target air-fuel ratio set by the target air-fuel ratio setting means, characterized by having a temperature detecting means which detects the temperature of burned gas in the cylinder of the engine when the engine is being started, a determining means which determines whether the temperature detected by the temperature detecting means is not higher than a predetermined value and an air-fuel ratio correcting means which corrects the target air-fuel ratio set by the target air-fuel ratio setting means to a higher value when the determining means determines that the temperature detected by the temperature detecting means is not higher than the predetermined value.

In accordance with a fourth aspect of the present invention, there is provided a gaseous fuel engine which runs on gaseous fuel containing at least partly hydrogen gas and comprises a fuel supply means which supplies said gaseous fuel to a cylinder of the engine, and an air-fuel ratio control means which controls the air-fuel ratio according to the operating condition of the engine, wherein said fuel supply means comprises a direct injection means which supplies the gaseous fuel directly into the cylinder and a pre-mixing supply means which supplies the gaseous fuel through an air intake passage, and there is provided a fuel supply characteristic control means which increases the proportion of the fuel supplied to the cylinder by the direct injection means relative to the proportion of the fuel supplied to the cylinder by the pre-mixing supply means when the air-fuel ratio set by the air-fuel ratio control means is richer than a threshold air-fuel ratio which is leaner than a stoichiometric air-fuel ratio and decreases the same when the air-fuel ratio set by the air-fuel ratio control means is leaner than the threshold air-fuel ratio.

DESCRIPTION OF THE PREFERRED EMBODIMENTS

Figure 1:
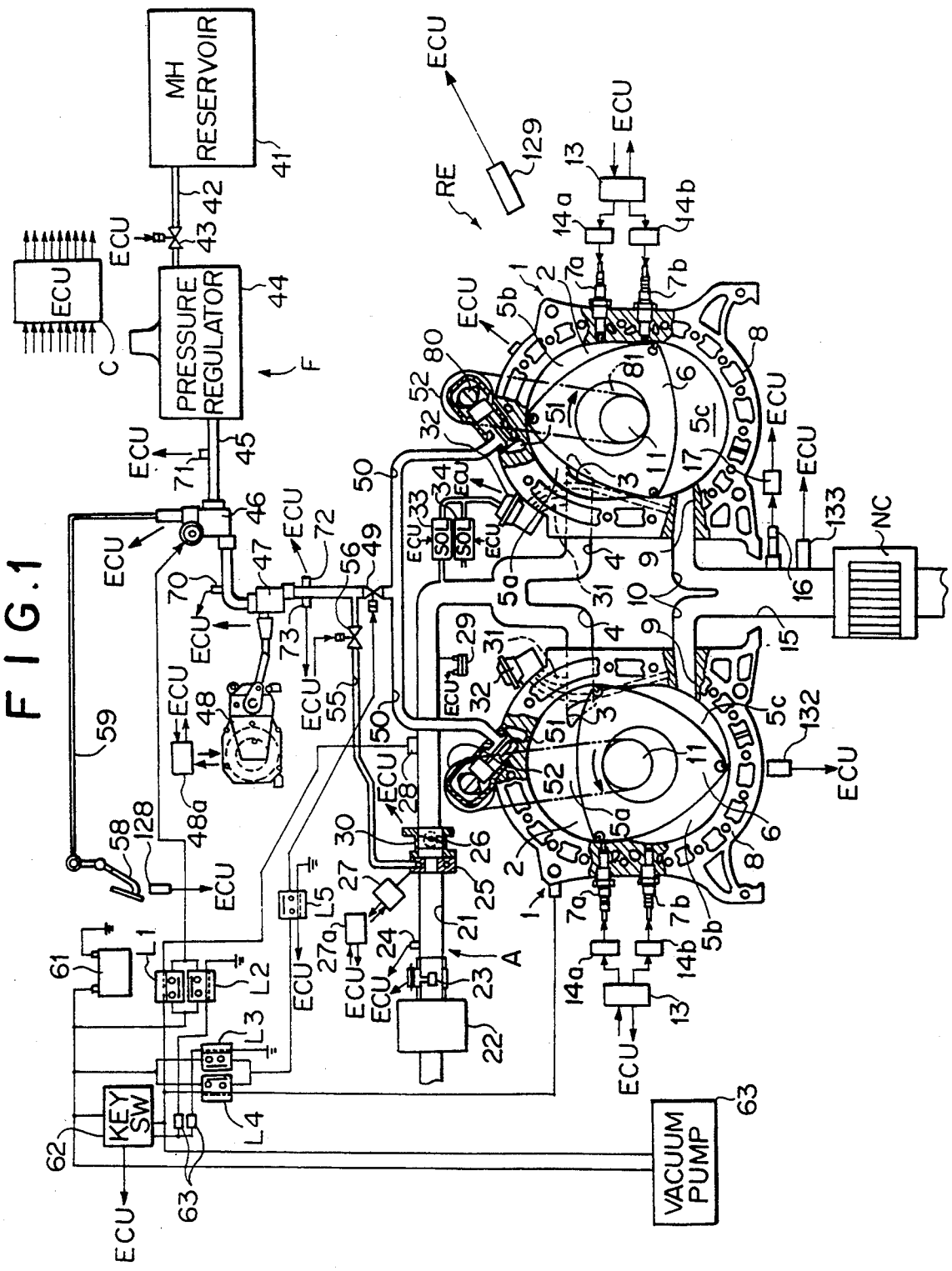
FIG. 1 is a schematic view showing a rotary piston engine in accordance with the first embodiment of the present invention.

In FIG. 1, a rotary piston engine RE in accordance with a first embodiment of the present invention has a pair of cylinders. Each of the cylinders has a casing 1 comprising a side housing 2, a rotor housing 8 having a trochoid inner surface and a three-lobe rotor 6 which rotates (planetary rotation) on an eccentric shaft 11 with the three lobes in contact with the trochoid inner surface of the rotor housing 8. The three lobes form three combustion chambers 5a, 5b and 5c with the casing 1. An intake port 3 opens in the inner side of the side housing 2 and an exhaust port 9 opens in the inner side of the rotor housing 8. The intake port 3 is connected to a discrete intake passage 4 and the exhaust port 9 is connected to a discrete exhaust passage 10. A hydrogen injection port 51 opens in the inner side of the rotor housing 8 to inject hydrogen gas directly into the combustion chamber. As the rotor 6 rotates and the intake port 3 is opened to one of the combustion chambers, air-fuel mixture (mixture of hydrogen and air) is introduced into the combustion chamber or air is solely introduced into the combustion chamber and hydrogen gas is injected into the air from the hydrogen port 51 to form air-fuel mixture in the manner which will be described in detail later. The air-fuel mixture is compressed as the rotor 6 further rotates and then ignited by spark plugs 7a and 7b. As the rotor 6 further rotates and the combustion chamber comes to communicate with the exhaust port 9, exhaust gas is discharged through the exhaust port 9 to the discrete exhaust passage 10.

Reference numeral denotes an ignitor and reference numerals 14a and 14b denote ignition coils for respectively producing sparks at the spark plugs 7a and 7b.

The discrete exhaust passages 10 for the respective cylinders are merged into a common exhaust passage 15. The common exhaust passage 15 is provided with an $O_2$ sensor 16 for detecting the $O_2$ concentration in exhaust gas and a NOx-reducing catalyst NC for converting NOx in exhaust gas. The output of the $O_2$ sensor 16 is input into a control unit C (ECU) through an amplifier 17. The control unit C calculates the air-fuel ratio (A/F) of the air-fuel mixture, i.e., the ratio of air to hydrogen in the air-fuel mixture in the combustion chamber, or the air excess coefficient ($\lambda$).

An intake system A for supplying air to the combustion chambers of the respective cylinders comprises a common intake passage 21 which opens to the atmosphere at its upstream end and is connected to the discrete intake passages 4 at its downstream end. An air cleaner 22, an airflow sensor 23, an intake air temperature sensor 24, a hydrogen mixer 25 (to be described later), a throttle valve 26, a boost switch 28 and a boost sensor 29 are provided in the common intake passage 21 in this order from the upstream side. The throttle valve 26 is driven by an electric throttle device 27 having a driving circuit 27a. The boost switch 28 detects whether an intake vacuum has been produced, and the boost sensor 29 detects the intake vacuum. The position of the throttle valve 26 (throttle opening) is detected by a throttle position sensor 30. Further, reference numerals 128, 129, 132 and 133 respectively denotes an accelerator position sensor, an engine speed sensor, a coolant temperature sensor which detects the temperature of the coolant in the water jacket of the engine and an exhaust temperature sensor which detects the temperature of the exhaust gas in the exhaust passage 15. The detecting signals of these sensors are input into the control unit C. Further a starting signal from a key switch 62 is input into the control unit C.

In order to prevent the combustion temperature of the air-fuel mixture from increasing excessively high, the intake system A is provided with EGR passages 31 for returning a part of exhaust gas in the exhaust ports 9 to the discrete intake passages 4 and EGR valves 32 which controls the flow of the EGR gas. The EGR valves 32 are controlled by the control unit C by way of first and second solenoids 33 and 34.

A fuel supply system F supplies hydrogen gas directly or indirectly to the combustion chambers. Though, in this particular embodiment, hydrogen gas is used as the gaseous fuel, other gaseous fuels containing therein hydrogen such as methane, ethane and the like may be used as the gaseous fuel.

The fuel supply system F comprises a metal hydride reservoir 41 having therein a hydrogen storage alloy (metal hydride) which can store and release hydrogen. The hydrogen storage alloy may of a known type which occludes hydrogen gas with the hydrogen gas compressed to about 1/1000 in volume when the alloy is cooled and brought into contact with the hydrogen gas, and releases the occluded hydrogen gas under a substantial pressure when it is heated. Since the hydrogen storage alloy occludes hydrogen in the solid state as a part of compound, the pressure in the metal hydride reservoir is low, which ensures safety. Even if the hydrogen storage alloy repeats occlusion and release by a number of times (e.g., 1000 times), the function of the alloy hardly deteriorates.

The hydrogen gas discharged from the metal hydride reservoir 41 is fed to a pressure regulator 44 through a first hydrogen supply passage 42 which is provided with a solenoid valve 43, and the pressure of the hydrogen gas is regulated (reduced) to a predetermined pressure (e.g., 5 kg/cm$^2$·G). The regulated hydrogen gas is fed toward the engine through a second hydrogen supply passage 45. The second hydrogen supply passage 45 is provided with first and second hydrogen flow control valves 46 and 47. The first hydrogen flow control valve 46 is connected to an accelerator pedal 58 by way of a link mechanism 59 to be opened and closed in response to movement of the accelerator pedal 58. The second hydrogen flow control valve 47 is opened and closed by an actuator 48 having a driving circuit 48a. Further the second hydrogen supply passage 45 is provided with three pressure sensors 70 to 72 and a temperature sensor 73.

As will be described later, the second hydrogen flow control valve 47 controls flow of the hydrogen gas under the control of a signal from the control unit C so that the air-fuel ratio (air excess coefficient) converges on a target air-fuel ratio (target air excess coefficient) which is set according to the accelerator opening (the amount of depression of the accelerator pedal 58) and the engine speed.

Basically flow of the hydrogen gas, i.e., the air-fuel ratio, is controlled by the second hydrogen flow control valve 47, and in case of failure or the like of the second hydrogen flow control valve 47, the first hydrogen flow control valve 46 backs up the second hydrogen flow control valve 47.

A first solenoid control valve 49 is provided in the second hydrogen supply passage 45 downstream of the second hydrogen flow control valve 47, and the second hydrogen supply passage 45 branches just downstream of the first solenoid control valve 49 into a pair of discrete direct injection hydrogen supply passages 50 for directly injecting the hydrogen gas into the respective cylinders. The discrete hydrogen supply passages 50 are connected to the respective hydrogen injection ports 51 at their downstream ends. A hydrogen injection valve 52 opens the hydrogen injection port 51 at a predetermined timing in the beginning of the compression stroke so that the hydrogen gas in the direct injection hydrogen supply passage 50 is injected into the combustion chamber in the compression stroke.

Though not shown in detail, the hydrogen injection valve 52 is opened and closed by a cam 80 on a camshaft which is driven by the eccentric shaft 11 by way of a timing belt 81 to rotate in synchronization therewith.

Figure 2:
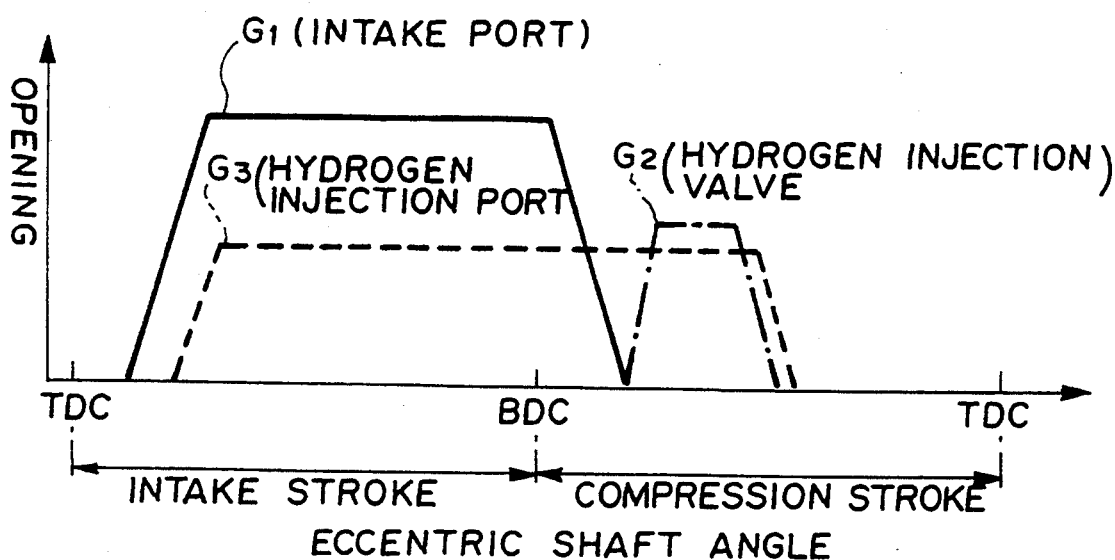
FIG. 2 is a view showing the opening and closing timing of the intake port, the hydrogen injection port and the hydrogen injection valve in the engine shown in FIG. 1.

FIG. 2 shows the opening timing (G1) of the intake port 3, the opening timing (G2) of the hydrogen injection valve 52 and the opening timing (G3) of the hydrogen injection port 51.

A pre-mixing hydrogen supply passage 55 is connected to the second hydrogen supply passage 45 between the second hydrogen flow control valve 47 and the first solenoid control valve 49 at its upstream end and to said hydrogen mixer 25 at its downstream end. The pre-mixing hydrogen supply passage 55 is provided with a second solenoid control valve 56.

The first and second solenoid control valves 49 and 56 are driven by an electric circuit comprising a battery 61, a key switch 62, a delay timer 63, first to fifth relays L1 to L5 and the like under the control of a signal output from the control unit C. That is, the first and second solenoid control valves 49 and 56 are opened and closed by the control unit C according to the air-fuel ratio.

When the first solenoid control valve 49 is opened with the second solenoid control valve 56 closed, the hydrogen gas in the second hydrogen supply passage 45 is all (100%) directly injected into the combustion chamber through the direct injection hydrogen supply passage 50 and the hydrogen injection port 51. (This will be referred to as "the direct injection", hereinbelow.) In this case, since the hydrogen gas is injected after charge of air into the combustion chamber, the charging efficiency is increased and the engine output power is increased.

On the other hand, when the second solenoid control valve 56 is opened with the first solenoid control valve 49 closed, the hydrogen gas in the second hydrogen supply passage 45 is all (100%) supplied to the common intake passage 21 through the pre-mixing hydrogen supply passage 55 and the hydrogen mixer 25. (This will be referred to as "the pre-mixing supply", hereinbelow. In this case, since the hydrogen gas is better mixed with the intake air, the burning speed of the air-fuel mixture is increased and the thermal efficiency is improved, thereby improving the the fuel economy.

Further, by adjusting the opening of the first and second solenoid control valves 49 and 56, the proportion of the amount of the hydrogen gas supplied through the hydrogen injection port 51 to that supplied through the hydrogen mixer 25 can be set freely.

The control unit C controls the air-fuel ratio A/F or the air excess coefficient $\lambda$ according to the operating condition, and the proportion of the amount of the hydrogen gas supplied through the hydrogen injection port 51 to that supplied through the hydrogen mixer 25, that is, the proportion of the amount of the hydrogen gas supplied by the direct injection to that supplied by the pre-mixing supply is controlled according to the air-fuel ratio A/F or the air excess coefficient $\lambda$. Since the air-fuel ratio is substantially equivalent to the air excess coefficient $\lambda$, the air-fuel ratio will be expressed in the term of the air excess coefficient $\lambda$ for the purpose of simplicity, hereinbelow.

Figure 3:
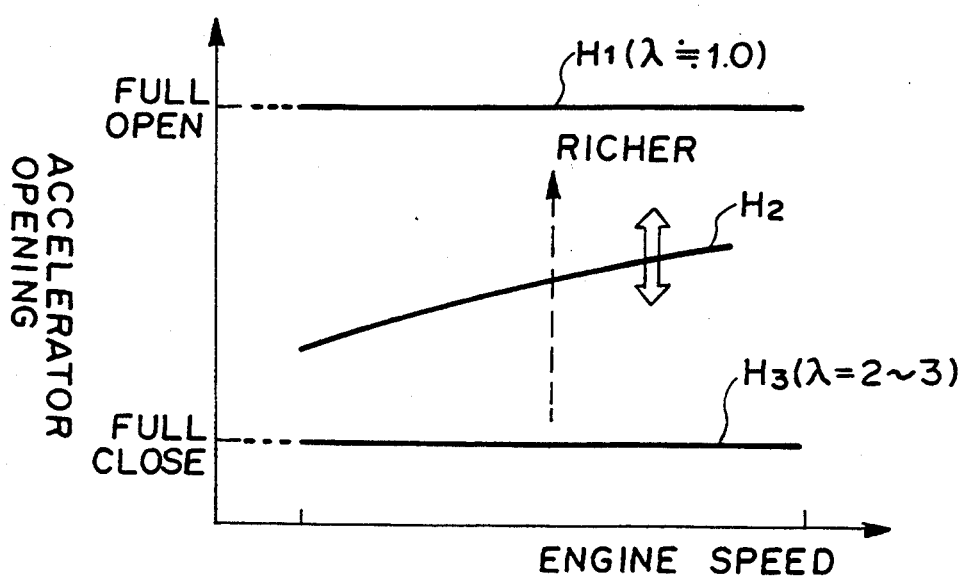
FIG. 3 shows the relation of the target air excess coefficient $\lambda$ to the accelerator opening and the engine speed.

The air excess coefficient $\lambda$ is set according to the accelerator opening and the engine speed with the characteristics shown in FIG. 3. As shown in FIG. 3, when the accelerator is full opened, the air excess coefficient $\lambda$ is set to about 1.0 (stoichiometric air-fuel ratio) irrespective of the engine speed (line H1) in order to increase the engine output power, and when the accelerator is full closed, it is set to a lean limit (air excess coefficient $\lambda$ is 2 to 3) in order to improve the fuel economy (line H3). The lean limit is a value above which the combustibility of the air-fuel mixture deteriorates and engine vibration gets hard. When the accelerator is partly opened, the air excess coefficient $\lambda$ is set according to the accelerator opening and the engine speed so that the air-fuel mixture becomes richer as the engine output increases. Line H2 in FIG. 3 shows a predetermined threshold air excess coefficient $\lambda$ (a constant value) below which (when the air-fuel ratio set is richer than the value represented by the threshold air excess coefficient $\lambda$) the hydrogen gas is supplied to the combustion chamber by the direct injection and above which the hydrogen gas is supplied to the combustion chamber by the pre-mixing supply.

That is, when the air-fuel ratio set is richer than the value represented by the threshold air excess coefficient $\lambda$, the first solenoid control valve 49 is full opened and the second solenoid control valve 56 is full closed, whereby the hydrogen gas is supplied to the combustion chamber solely through the hydrogen injection port 51 (direct injection). When the air-fuel ratio set is leaner than the value represented by the threshold air excess coefficient $\lambda$, the second solenoid control valve 56 is full opened and the first solenoid control valve 49 is full closed, whereby the hydrogen gas is supplied to the combustion chamber solely through the hydrogen mixer 25 and the intake passage 21 (pre-mixing supply). Thus, in this embodiment, emission of NOx is reduced to the least possible while ensuring good engine output power and fuel economy. Further in this embodiment, the switching control is very simple since the switching between the direct injection and the pre-mixing supply is effected on the basis of the predetermined threshold air excess coefficient $\lambda$ which is a constant value.

The reason why the switching between the direct injection and the pre-mixing supply is effected in the manner described above is as follows.

Figure 4:
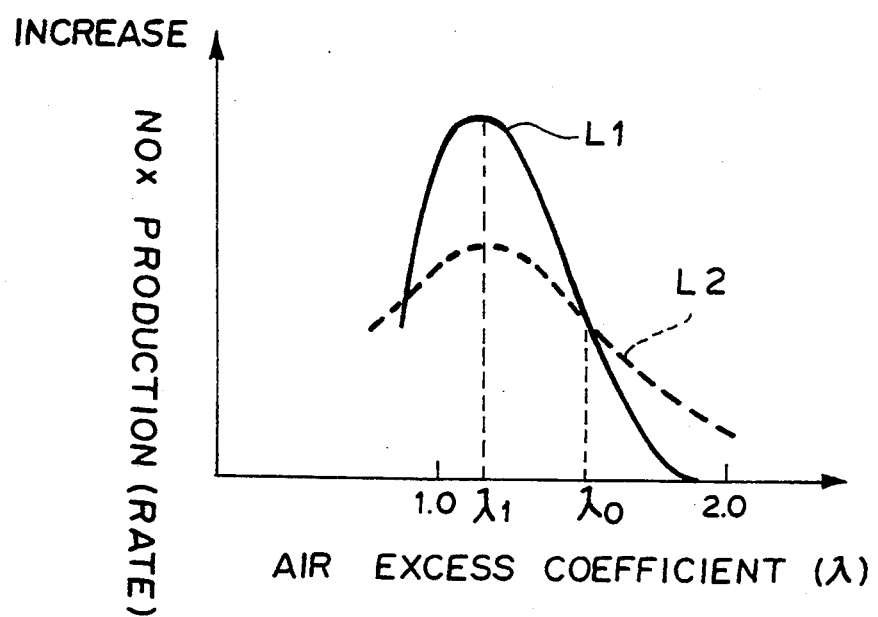
FIG. 4 shows the relations between the air excess coefficient $\lambda$ and NOx production during the pre-mixing supply and the direct injection.

The amount of NOx produced when the hydrogen gas is supplied by the pre-mixing supply changes with the air excess coefficient $\lambda$ as shown by line L1 in FIG. 4 and the amount of NOx produced when the hydrogen gas is supplied by the direct injection changes with the air excess coefficient $\lambda$ as shown by line L2. As can be seen from FIG. 4, in the case of pre-mixing supply, NOx is produced at a very high rate in a relatively rich region where the air excess coefficient $\lambda$ is about 0.9 to 1.5 whereas NOx is produced at a very low rate in a relatively lean region where the air excess coefficient $\lambda$ is not smaller than about 1.5. That is, in the case of pre-mixing supply, the hydrogen gas is mixed with air for a relatively long time and a substantially uniform air-fuel mixture is formed. Accordingly the burning speed of the air-fuel mixture is very high and the burning temperature is increased in the rich region, which result in a large NOx production. However in the lean region, a relatively small amount of heat is produced and the burning temperature is low, which results in a very small NOx production.

On the other hand, in the case of the direct injection, the NOx production is not so small as in the case of the pre-mixing supply in the lean region though it is not so large as in the case of the pre-mixing supply in the rich region. That is, in the case of the direct injection, the hydrogen gas is mixed with air only for a very short time, and accordingly the air-fuel mixture is layers, some rich and some lean. Accordingly even if the air-fuel mixture is relatively rich as a whole, propagation of the flame is prevented by the lean part and the burning speed is lowered, whereby the burning temperature does not become so high. However even if the air-fuel mixture is relatively lean as a whole, the burning temperature locally becomes high in the relatively rich part and accordingly, the NOx production is not so reduced.

As can be seen from FIG. 4, the NOx production in the pre-mixing supply and that in the direct injection are reversed at an air excess coefficient $\lambda 0$ of about 1.5. Accordingly, in this embodiment, when the air excess coefficient $\lambda$ set is smaller (richer) than the air excess coefficient $\lambda 0$, that is, in the operating range between the lines H1 and H2 in FIG. 3, the hydrogen gas is supplied by the direct injection, thereby suppressing NOx production, and when the air excess coefficient $\lambda$ set is larger (leaner) than the air excess coefficient $\lambda 0$, that is, in the operating range between the lines H2 and H3 in FIG. 3, the hydrogen gas is supplied by the pre-mixing supply, thereby suppressing NOx production. Thus, in this embodiment, NOx production is greatly reduced in total.

Further, since the hydrogen gas is supplied by the direct injection in the region where a high engine output power is required and the air-fuel ratio is set to be relatively rich, the engine output power can be highly increased. On the other hand, when the engine output power requirement is relatively low, the air-fuel ratio is made lean and at the same time, the hydrogen gas is supplied by the pre-mixing supply, whereby the thermal efficiency is improved and the fuel economy is greatly improved.

In one modification of the embodiment described above, the direct injection and the pre-mixing supply are switched in the following manner.

That is, basically the hydrogen gas is supplied by both the direct injection and the pre-mixing supply, and when the air excess coefficient λ set is smaller (richer) than the air excess coefficient λ0, the proportion of the hydrogen gas supplied by the direct injection is increased relative to that supplied by the pre-mixing supply, and when the air excess coefficient λ set is larger (leaner) than the air excess coefficient λ0, the proportion of the hydrogen gas supplied by the direct injection is decreased relative to that supplied by the pre-mixing supply. With this arrangement, the thermal efficiency can be improved over the entire operating range while suppressing NOx production.

In another modification of the embodiment described above, the direct injection and the pre-mixing supply are switched in the following manner.

That is, in this modification, a predetermined value λ1 between 1 and λ0 is set to be a switching air excess coefficient, and when the air excess coefficient λ set is smaller (richer) than λ1, the hydrogen gas is supplied by the direct injection, and when the air excess coefficient λ set is between λ1 and λ0, the hydrogen gas is supplied by both the direct injection and the pre-mixing supply, and when the air excess coefficient λ set is larger (leaner) than λ0, the hydrogen gas is supplied by the pre-mixing supply. With this arrangement, the thermal efficiency, i.e., the combustibility, is improved when the air excess coefficient A set is between λ1 and λ0 while suppressing NOx production.

In still another modification of the embodiment described above, the direct injection and the pre-mixing supply are switched in the following manner.

That is, when the air excess coefficient λ set is near the value at which NOx production is maximized (about 1.1), the hydrogen gas is supplied by the direct injection and when the air excess coefficient λ set is larger than the value, the hydrogen gas is supplied by both the direct injection and the pre-mixing supply with the proportion of the hydrogen gas supplied by the direct injection decreased as the air excess coefficient λ set increases. With this arrangement the hydrogen gas may be supplied under a low pressure, whereby the flow rate of the hydrogen gas can be controlled more precisely.

The NOx-reducing catalyst NC provided in the common exhaust passage 15 converts NOx in exhaust gas into harmless gasses if produced.

Now a second embodiment of the present invention will be described with reference to FIGS. 5 to 7, hereinbelow. This embodiment differs from the first embodiment mainly in the manner of determining the target air-fuel ratio, and accordingly description will be made mainly on determination of the target air-fuel ratio.

The control unit C receives detecting signals from the airflow sensor 23, the accelerator opening sensor 128, the engine speed sensor 129, the pressure sensor 71 and the like, and controls the electric throttle device 27 so that the opening of the throttle valve 26 (amount of intake air) corresponds to the accelerator opening, and at the same time, controls second flow control valve 47.

Figure 5:
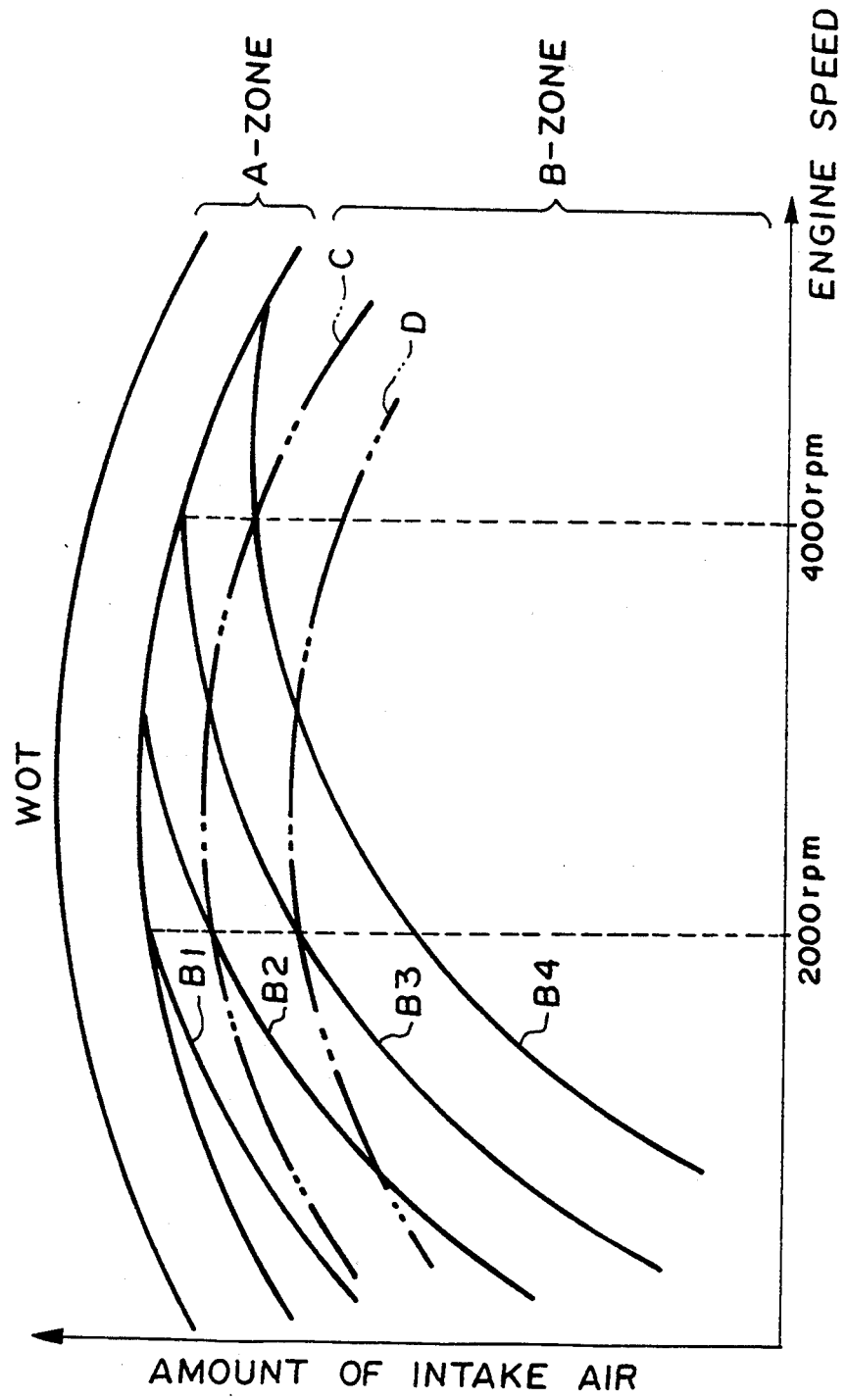
FIG. 5 is a map showing the relation of the target air excess coefficient $\lambda$ to the amount of intake air and the engine speed employed in the second embodiment.

The control unit C has a built-in memory which stores an air excess coefficient map shown in FIG. 5 where the air excess coefficient λ is related to the amount of intake air and the engine speed. The control unit C determines the target air excess coefficient λ according to the map and calculates the target opening of the second flow control valve 47 corresponding to the target air excess coefficient λ. Then the control unit C causes the actuator 48 to control the second flow control valve 47 so that the opening of the second flow control valve 47 converges on the target opening.

As shown in FIG. 5, the map is divided into a A-zone corresponding to a heavy load range and B-zone corresponding to a light load range. The A-zone is for determining the target air excess coefficient λ when the engine is operating under heavy load (e.g., at an accelerator opening of not smaller than 90%). In the A-zone, the target air excess coefficient λ is set to a value (e.g., about 1.0) smaller than the air excess coefficient λ1 at which NOx production is maximized. In some case, it is preferred that the target air excess coefficient λ be set to 0.8 in the A-zone in order to ensure a high engine output power.

The B-zone is for determining the target air excess coefficient λ when the engine is operating under light load (e.g., at an accelerator opening of smaller than 90%). In the B-zone, the target air excess coefficient λ is set to a value (e.g., 1.5) larger than the air excess coefficient λ1 at which NOx production is maximized. Further in the B-zone, the target air excess coefficient λ is gradually increased as the engine speed increases and as the engine load decreases. That is, lines B1, B2, B3 and B4 respectively show the operating conditions where the target air excess coefficient λ is set to, for instance, 1.6, 1.8, 2.0 and 3.0. According to the lines B1 to B4, the target air excess coefficient λ is increased, as the engine speed increases. Further in the line B1 to B4, the line B1 is for the heaviest engine load and the line B4 is for the lightest engine load. Accordingly, as viewed along an equivalent engine load line C or D, the target air excess coefficient λ is increased as the engine speed increases. In the B-zone, the target air excess coefficient λ may be set to be 2.0 at the largest in the case where sufficient engine output torque cannot be obtained if the air excess coefficient λ is as large as 3.0.

The reason why the target air excess coefficient λ is set to about 1.0 (substantially corresponding to the stoichiometric air-fuel ratio) in the A-zone is as follows. That is, when the engine load is heavy, the air excess coefficient λ must be small in order to meet a high engine torque requirement. At the same time, NOx production is maximized when the air excess coefficient λ is somewhat larger than 1.0 and it is preferred that the air excess coefficient λ be not equal to the value at which NOx production is maximized in view of suppressing NOx production.

Further the NOx reducing catalyst NC most effectively converts NOx into harmless gases when the air excess coefficient λ is 1. Also on this point, the air excess coefficient λ of 1.0 is preferable.

The reason why the target air excess coefficient λ is increased as the engine speed increases in the B-zone is as follows. For example, when the engine speed is 2000 rpm, the relation between the air excess coefficient λ and NOx production is as shown by the solid line E in FIG. 7, and almost no NOx is produced when the air excess coefficient λ is larger than about 1.6. However when the engine speed reaches 4000 rpm, the flow speed of the air-fuel mixture upon ignition becomes high and the burning speed increases, and accordingly, reduction in NOx production with increase in the air excess coefficient λ becomes small as compared with at 2000 rpm as shown by the chained line F in FIG. 7. Accordingly, the target air excess coefficient λ is further increased when the engine speed is 4000 rpm in order to better suppress NOx production.

Further by increasing the air excess coefficient λ, not only NOx production can be suppressed but also the fuel economy can be improved. Further, in order to suppress change in the engine torque when the operating condition shifts from the A-zone to the B-zone or from the B-zone to the A-zone, the difference in the target air excess coefficient λ on opposite sides of the boundary between the A-zone and the B-zone is made not to be larger than necessary. Further in the B-zone, the target air excess coefficient λ is gradually increased so that the air-fuel mixture becomes gradually leaner as the engine speed increases and change in the engine torque with change in the engine speed is minimized.

Figure 6:
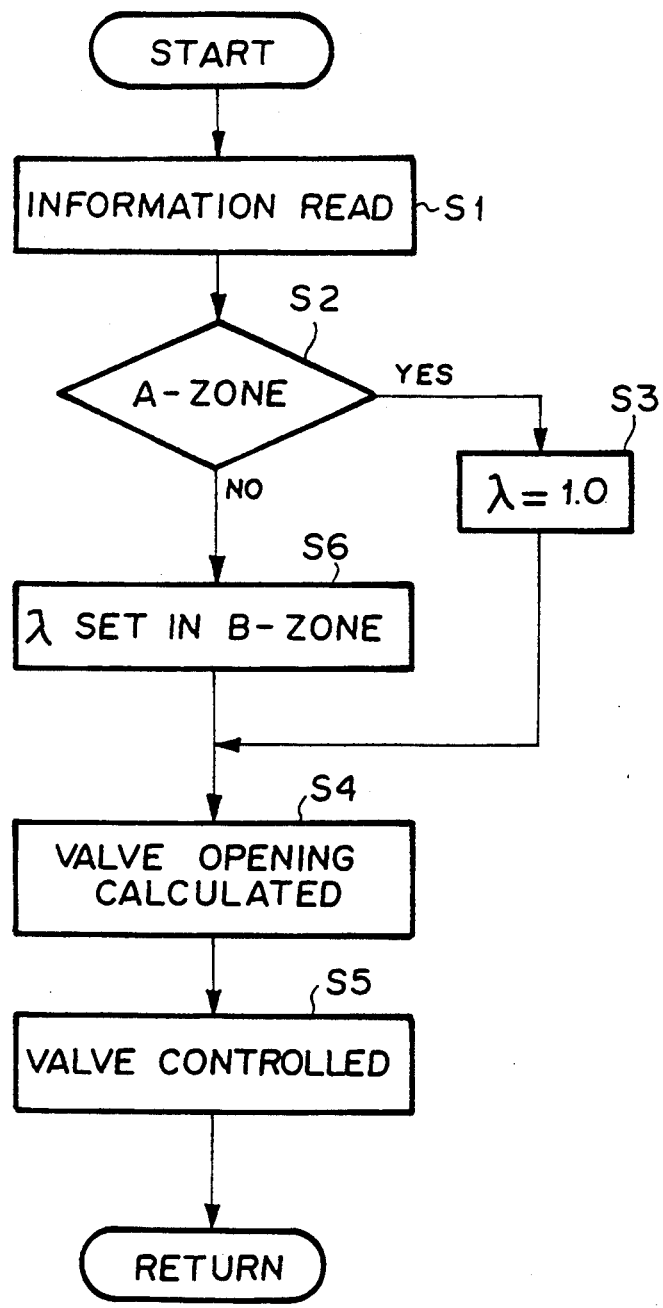
FIG. 6 is a flow chart for illustrating the control of the second flow control valve performed by the control unit in the second embodiment.
Figure 7:
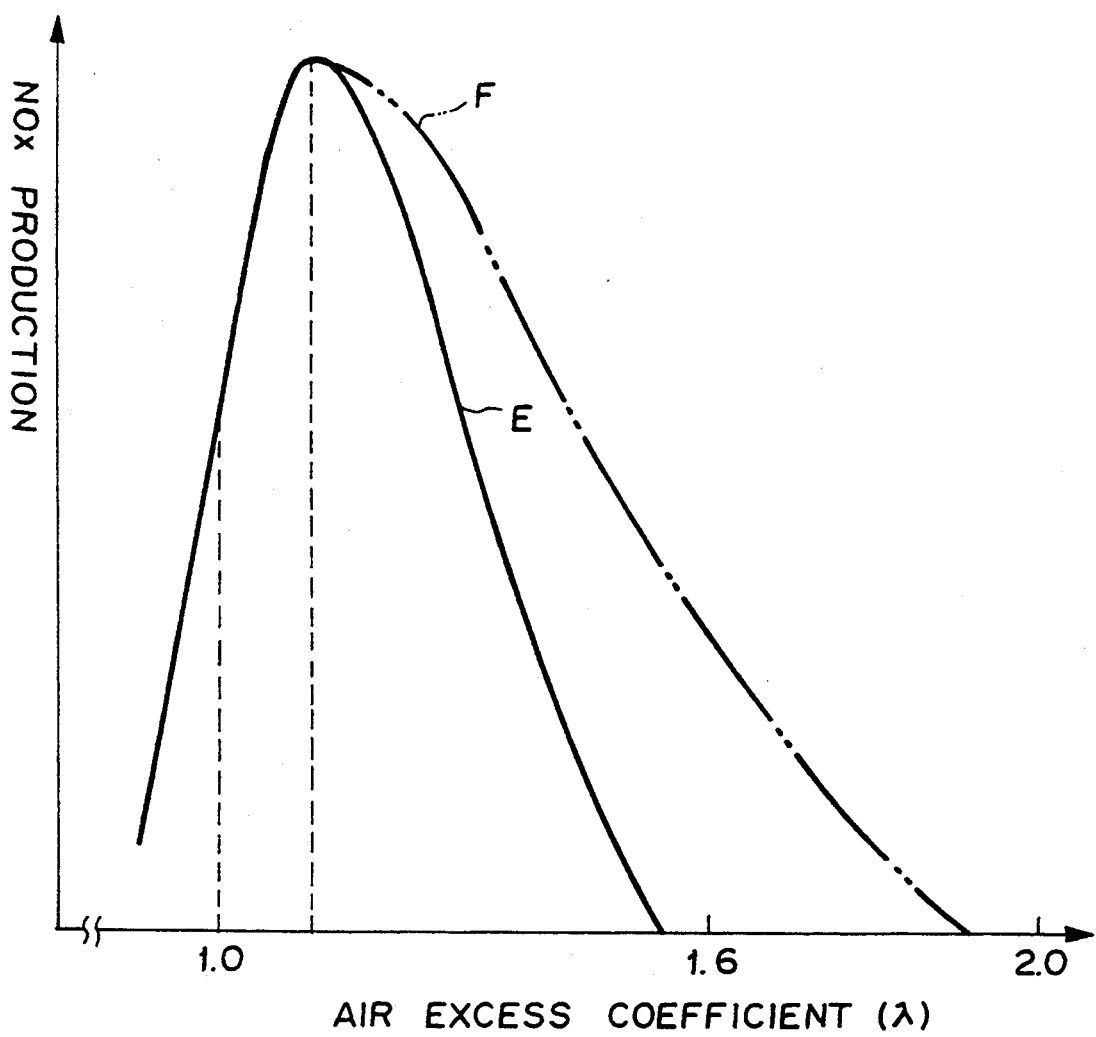
FIG. 7 is a view showing the relation between the air excess coefficient $\lambda$ and NOx production.

As shown in FIG. 6, the control unit C first reads the accelerator opening, the amount of intake air and the engine speed (step S1) and determines whether the operating condition of the engine is in the A-zone on the basis of the information (step S2). When it is determined that the operating condition is in the A-zone, the control unit C sets the target air excess coefficient λ to about 1.0. (step S3) Then the control unit C calculates the target opening of the second flow control valve 47 corresponding to the target air excess coefficient λ of about 1.0 and outputs a control signal to the actuator 48 to cause the actuator to control the opening of the second flow control valve 47 to the target opening calculated. (steps S4 and S5)

When it is determined in step S2 that the operating condition is not in the A-zone, that is, when the operating condition is in the B-zone, the control unit C determines the target air excess coefficient λ according to the map shown in FIG. 5 on the basis of the accelerator opening, the amount of intake air and the engine speed read in step S1. (step S6) For example, when the accelerator opening is 80% (line C in FIG. 5) and the engine speed is 2000 rpm, the control unit C sets the target air excess coefficient λ to 1.8. When the engine speed subsequently increases to 4000 rpm with the accelerator opening kept at 80%, the control unit C sets the target air excess coefficient λ to 3.0.

Thus, in this embodiment, even if the accelerator opening is fixed and the engine load is constant, the target air excess coefficient λ is increased with increase in the engine speed. Accordingly, the air-fuel mixture is made leaner in response to lowering of the NOx-production suppressing effect due to increase in the engine speed, thereby suppressing NOx production.

Further, when the accelerator opening is reduced, for instance, from 70% (line C in FIG. 5) to 80% (line D in FIG. 5) at an engine speed of, for instance, 2000 rpm, the target air excess coefficient λ is increased from 1.8 to 2.0. That is, when the accelerator opening is reduced, the engine torque requirement is not so high, and accordingly, the fuel consumption is reduced by increasing the air excess coefficient λ for a given engine speed.

Though, in the second embodiment, the target air excess coefficient λ in the B-zone is continuously changed with change in the engine speed and the engine load, the target air excess coefficient λ may be changed stepwise (e.g., in two steps).

Further, the second embodiment may also be applied to the gaseous fuel engines where the gaseous fuel is supplied to the engine solely by the pre-mixing supply or by the direct injection.

Now a third embodiment of the present invention will be described with reference to FIGS. 8 to 10, hereinbelow. This embodiment also differs from the first embodiment mainly in the manner of determining the target air-fuel ratio and is similar to the second embodiment, and accordingly the difference from the second embodiment will be mainly described.

Figure 9:
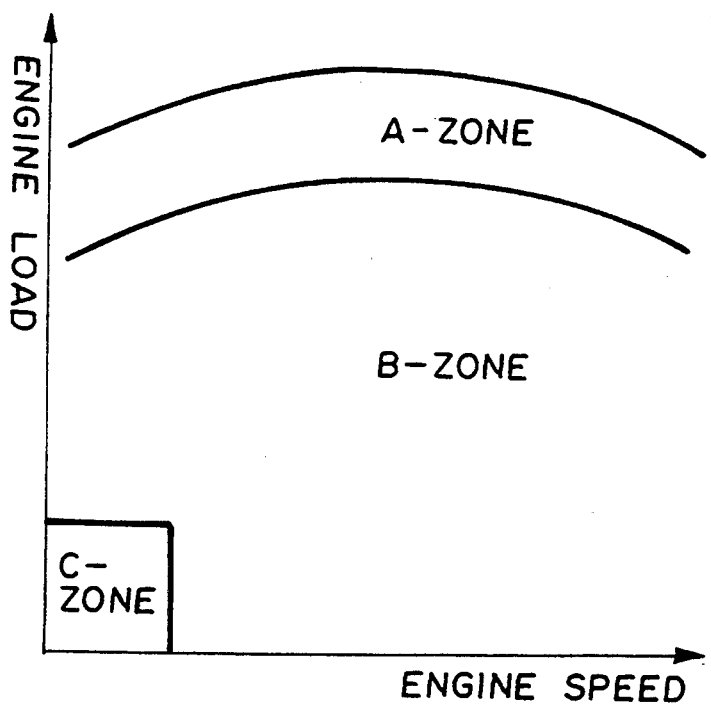
FIG. 9 is a map showing the relation of the target air excess coefficient $\lambda$ to the engine load and the engine speed employed in the second embodiment when the engine is warm.

In this embodiment, the control unit C has a built-in memory which stores an air excess coefficient map shown in FIG. 9 similar to the map shown in FIG. 5.

As shown in FIG. 9, the map is divided into a A-zone corresponding to a heavy load range, a B-zone corresponding to a light load range and a C-zone corresponding to an engine starting range. The A-zone and the B-zone are substantially the same as those in the second embodiment though the target air excess coefficient λ is set above about 1.3 in the B-zone in this embodiment and accordingly will not be described in detail here. The C-zone is for determining the target air excess coefficient λ during starting of the engine. In the C-zone, the target air excess coefficient λ is set to about 1.0 in order to start up the engine in a short time.

Figure 10:
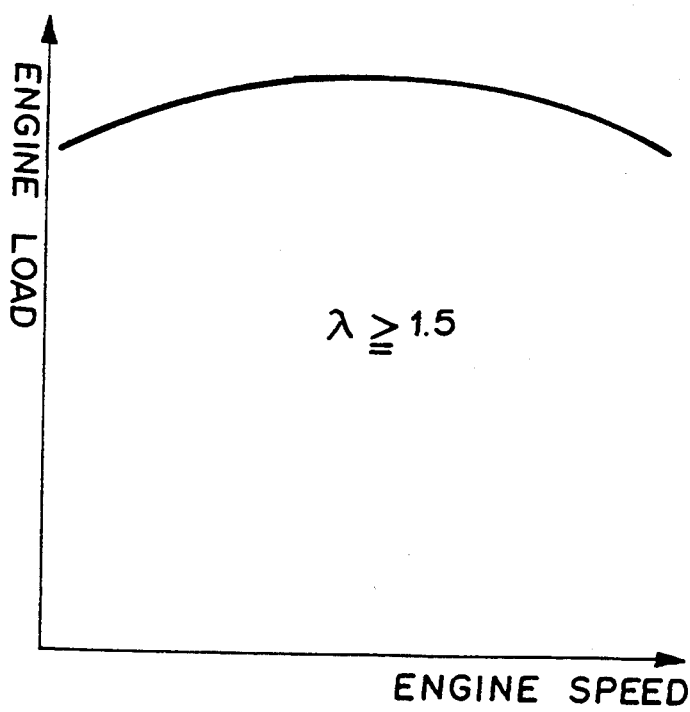
FIG. 10 is a map showing the relation of the target air excess coefficient $\lambda$ to the engine load and the engine speed employed in the second embodiment when the engine is cold.

The built-in memory of the control unit C further stores an air excess coefficient map for the cold engine shown in FIG. 10. The control unit C determines the temperature of burned gas in the cylinder on the basis of the temperature of the engine coolant and/or the temperature of the exhaust gas, and when the temperature of the burned gas is lower than a predetermined value (when the engine is cold), the control unit C determines the target air excess coefficient λ according to the air excess coefficient map for the cold engine shown in FIG. 10 instead of the map shown in FIG. 9. According to the air excess coefficient map for the cold engine, the target air excess coefficient λ is set to at least 1.5. That is, when the engine is cold, the air-fuel mixture is made lean in the heavy engine load range as well as the light engine load range and also during starting of the engine. At this time, the target air excess coefficient λ may be increased only in the operating range where the target air excess coefficient λ is set to be relatively small when the engine is warm, e.g., in the A-zone and C-zone. Further, the target air excess coefficient λ may be further increased in the B-zone.

The control unit C detects fluctuation in the engine speed when the engine is cold and determines that a drop of water adheres to the spark plug and causes misfire when the fluctuation in the engine speed exceeds an acceptable range. Then the control unit C further increases the target air excess coefficient λ set according to the air excess coefficient map for the cold engine, whereby the steam concentration in the burned gas is further lowered and adhesion of a water drop to the spark plug can prevented more surely.

Figure 8:
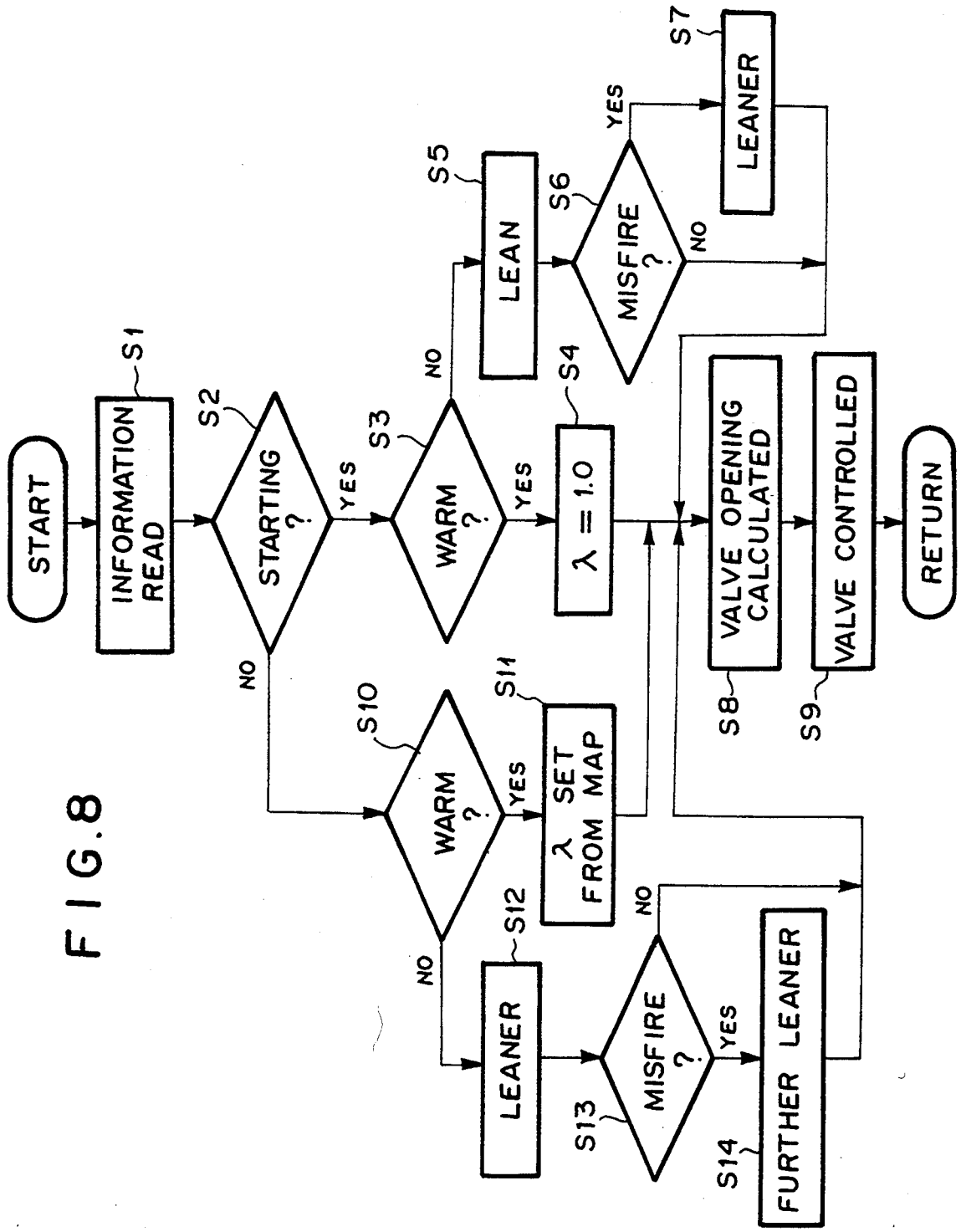
FIG. 8 is a flow chart for illustrating the control of the second flow control valve performed by the control unit in the third embodiment.

As shown in FIG. 8, the control unit C first reads the amount of intake air, the accelerator opening, the engine speed and the like (step S1) and then determines whether the engine is being started on the basis of whether the starter switch is on or whether the engine speed is lower than a predetermined value (step S2).

When it is determined that the engine is being started, the control unit C determines whether the engine is warm (where the temperature of burned gas in the cylinder is higher than a predetermined value) on the basis of the temperature of the engine coolant and/or the temperature of exhaust gas. (step S3) This determination may be made in various ways. For example, it may be made solely based on the temperature of the engine coolant. Otherwise it may be made, on the basis of the temperature of the engine coolant and the time from the time the engine begins to be started. That is, when a predetermined time has lapsed after the engine begins to be started, it is determined that the engine is warm. The predetermined time may be changed according to the temperature of the engine coolant at the time the engine begins to be started. Further the determination may be made taking into account the temperature of intake air. For example, when the temperature of intake air is high, said predetermined time for a given temperature of the engine coolant at the time the engine begins to be started may be shortened or the temperature of the engine coolant at the time the engine begins to be started for a given predetermined time may be lowered. Further, it may be determined that the engine is warm when the temperature of exhaust gas reaches a predetermined value which may be lowered as the temperature of intake air increases.

When it is determined that the engine is warm, the control unit C sets the target air excess coefficient $\lambda$ to about 1.0 according to the map shown in FIG. 9 (C-zone). (step S4) Then the control unit C calculates the target opening of the second flow control valve 47 corresponding to the target air excess coefficient $\lambda$ of about 1.0 and causes the actuator 48 to control the opening of the second flow control valve 47 to the target opening calculated. (steps S8 and S9) When it is determined in step S3 that the engine is not warm (is cold), the control unit C sets the target air excess coefficient $\lambda$ to at least 1.5 according to the map shown in FIG. 10. (step S5)

Then the control unit C determines whether misfire is occurring on the basis of whether the fluctuation in the engine speed is in an acceptable range. (step S6) When it is determined that misfire is occurring, the control unit C corrects (increases) the target air excess coefficient $\lambda$ (set in step S5) according to the map shown in FIG. 10. (step S7) Then the control unit C calculates the target opening of the second flow control valve 47 corresponding to the target air excess coefficient $\lambda$ set in step S7 and causes the actuator 48 to control the opening of the second flow control valve 47 to the target opening calculated. (steps S8 and S9) When it is determined that misfire is not occurring, the control unit C calculates the target opening of the second flow control valve 47 corresponding to the target air excess coefficient $\lambda$ set in step S5 and causes the actuator 48 to control the opening of the second flow control valve 47 to the target opening calculated. (steps S8 and S9)

When it is determined in step S2 that the engine is running, the control unit C determines whether the engine is warm. (step S10) When it is determined that the engine is warm, the control unit C sets the target air excess coefficient $\lambda$ to about 1.0 according to the map shown in FIG. 9. (step S11) Then the control unit C calculates the target opening of the second flow control valve 47 corresponding to the target air excess coefficient $\lambda$ set in step S11 and causes the actuators 48 to control the opening of the second flow control valve 47 to the target opening calculated. (steps S8 and S9) When it is determined in step S10 that the engine is cold, the control unit C sets the target air excess coefficient $\lambda$ to at least 1.5 according to the map shown in FIG. 10. (step S12)

Then the control unit C determines whether misfire is occurring. (step S13) When it is determined that misfire is occurring, the control unit C corrects (increases) the target air excess coefficient $\lambda$ (set in step S12) according to the map shown in FIG. 10. (step S14) Then the control unit C calculates the target opening of the second flow control valve 47 corresponding to the target air excess coefficient $\lambda$ set in step S14 and causes the actuator 48 to control the opening of the second flow control valve 47 to the target opening calculated. (steps S8 and S9) When it is determined that misfire is not occurring, the control unit C calculates the target opening of the second flow control valve 47 corresponding to the target air excess coefficient $\lambda$ set in step S12 and causes the actuator 48 to control the opening of the second flow control valve 47 to the target opening calculated. (steps S8 and S9)

Thus in this embodiment, the target air excess coefficient $\lambda$ is set to about 1.0 in order to start up the engine in a short time when the engine is being started while the engine is warm and to above about 1.5 when the engine is being started while the engine is cold. That is, when the air excess coefficient $\lambda$ is small (the air-fuel mixture is rich), the hydrogen gas concentration in the air-fuel mixture is high, which results in a high steam concentration in the burned gas in the cylinder. When the engine is cold, saturated steam in the burned gas is condensed and a drop of water adheres to the spark plug to cause misfire and prevent the engine from being started. By increasing the target air excess coefficient $\lambda$ when the engine is being started in a cold condition, such a problem can be overcome.

Further when the engine load becomes heavy while the engine is warm and running, the target air excess coefficient $\lambda$ is set to about 1.0 whereas when the engine load becomes heavy while the engine is running in a cold condition, the target air excess coefficient $\lambda$ is corrected to above 1.5. Also in this case, the steam concentration in the burned gas in the cylinder is reduced to prevent steam in the burned gas from being condensed to produce water drops on the cylinder wall which can flow into the oil pan.

Further, the third embodiment may also be applied to the gaseous fuel engines where the gaseous fuel is supplied to the engine solely by the pre-mixing supply or by the direct injection.

Though, in the embodiments described above, only hydrogen gas is used as the gaseous fuel, various mixtures of hydrogen gas with other gaseous fuels such as ethane, propane, methane and the like can be used.

Further the present invention may be applied not only to the rotary piston engine but also to the reciprocating engine.

What is claimed is:

1. An air-fuel ratio control system for a gaseous fuel engine which runs on gaseous fuel containing at least partly hydrogen gas comprising a fuel supply adjustment means which adjusts the amount of said gaseous fuel supplied to the engine and a control means which controls the fuel supply adjustment means to control the air-fuel ratio according to the engine load, characterized in that said control means controls said fuel supply adjustment means so that the air-fuel ratio becomes higher than a NOx-maximizing air-fuel ratio, at which the amount of NOx emitted from the engine is maximized, in a predetermined operating range of the engine, and in the predetermined operating range of the engine, the control means controls said fuel supply adjustment means so that the air-fuel ratio becomes higher in a high engine speed range than in a low engine speed range.

2. An air-fuel ratio control system as defined in claim 1 in which said control means controls said fuel supply adjustment means so that the air-fuel ratio becomes higher as the engine speed increases in said predetermined operating range of the engine.

3. An air-fuel ratio control system as defined in claim 1 or 2 in which said control means controls said fuel supply adjustment means so that the air-fuel ratio becomes lower than the NOx-maximizing air-fuel ratio when the engine load is heavier than a predetermined value and so that the air-fuel ratio becomes higher than the NOx-maximizing air-fuel ratio when the engine load is not heavier than the predetermined value.

4. An air-fuel ratio control system for a gaseous fuel engine which runs on gaseous fuel containing at least partly hydrogen gas comprising a fuel supply adjustment means which adjusts the amount of said gaseous fuel supplied to the engine, a target air-fuel ratio setting means which sets a target air-fuel ratio according to the operating condition of the engine, and a control means which controls the fuel supply adjustment means so that the air-fuel ratio converges on the target air-fuel ratio set by the target air-fuel ratio setting means, characterized by having a temperature detecting means which detects the temperature of burned gas in the cylinder of the engine, a determining means which determines whether the temperature detected by the temperature detecting means is not higher than a predetermined value and an air-fuel ratio correcting means which corrects the target air-fuel ratio set by the target air-fuel ratio setting means to a higher value when the determining means determines that the temperature detected by the temperature detecting means is not higher than the predetermined value.

5. An air-fuel ratio control system as defined in claim 4 further comprising a misfire detecting means which detects misfire in the engine and a re-correcting means which corrects the target air-fuel ratio corrected by the air-fuel ratio correcting means to a further higher value when misfire is detected while said determining means determines that the temperature detected by the temperature detecting means is not higher than the predetermined value.

6. An air-fuel ratio control system for a gaseous fuel engine which runs on gaseous fuel containing at least partly hydrogen gas comprising a fuel supply adjustment means which adjusts the amount of said gaseous fuel supplied to the engine, a target air-fuel ratio setting means which sets a target air-fuel ratio when the engine is being started, and a control means which controls the fuel supply adjustment means so that the air-fuel ratio converges on the target air-fuel ratio set by the target air-fuel ratio setting means, characterized by having a temperature detecting means which detects the temperature of burned gas in the cylinder of the engine when the engine is being started, a determining means which determines whether the temperature detected by the temperature detecting means is not higher than a predetermined value and an air-fuel ratio correcting means which corrects the target air-fuel ratio set by the target air-fuel ratio setting means to a higher value when the determining means determines that the temperature detected by the temperature detecting means is not higher than the predetermined value.

7. An air-fuel ratio control system as defined in claim 6 further comprising a misfire detecting means which detects misfire in the engine and a re-correcting means which corrects the target air-fuel ratio corrected by the air-fuel ratio correcting means to a further higher value when misfire is detected while said determining means determines that the temperature detected by the temperature detecting means is not higher than the predetermined value.

8. A gaseous fuel engine which runs on gaseous fuel containing at least partly hydrogen gas and comprises a fuel supply means which supplies said gaseous fuel to a cylinder of the engine, and an air-fuel ratio control means which controls the air-fuel ratio according to the operating condition of the engine, wherein said fuel supply means comprises a direct injection means which supplies the gaseous fuel directly into the cylinder and a pre-mixing supply means which supplies the gaseous fuel through an air intake passage, and there is provided a fuel supply characteristic control means which increases the proportion of the fuel supplied to the cylinder by the direct injection means relative to the proportion of the fuel supplied to the cylinder by the pre-mixing supply means when the air-fuel ratio set by the air-fuel ratio control means is richer than a threshold air-fuel ratio which is leaner than a stoichiometric air-fuel ratio and decreases the same when the air-fuel ratio set by the air-fuel ratio control means is leaner than the threshold air-fuel ratio.

9. A gaseous fuel engine as defined in claim 8 in which said fuel supply characteristic control means sets the proportion of the fuel supplied to the cylinder by the direct injection means to 100% when the air-fuel ratio set by the air-fuel ratio control means is richer than the threshold air-fuel ratio while sets the proportion of the fuel supplied to the cylinder by the pre-mixing supply means to 100% when the air-fuel ratio set by the air-fuel ratio control means is leaner than the threshold air-fuel ratio.

10. A gaseous fuel engine as defined in claim 9 in which said fuel supply characteristic control means sets the threshold air-fuel ratio constant irrespective of the engine speed.

11. A gaseous fuel engine as defined in claim 8 in which said fuel supply characteristic control means sets the proportion of the fuel supplied to the cylinder by the direct injection means to 100% when the air-fuel ratio set by the air-fuel ratio control means is richer than a switching air-fuel ratio which is leaner than the stoichiometric air-fuel ratio and richer than the threshold air-fuel ratio, sets the same to value larger than 0% and smaller than 100% when the air-fuel ratio set by the air-fuel ratio control means is between the switching air-fuel ratio and the threshold air-fuel ratio, and sets the proportion of the fuel supplied to the cylinder by the pre-mixing supply means to 100% when the air-fuel ratio set by the air-fuel ratio control means is leaner than the threshold air-fuel ratio.

12. A gaseous fuel engine as defined in claim 8 in which said fuel supply characteristic control means sets the proportion of the fuel supplied to the cylinder by the direct injection means to 100% when the air-fuel ratio set by the air-fuel ratio control means is in the range where NOx production is maximized and decreases the same as the air-fuel ratio set by the air-fuel ratio control means increases when it is leaner than the range where NOx production is maximized.

13. A gaseous fuel engine which runs on gaseous fuel containing at least partly hydrogen gas and comprises a fuel supply means which supplies said gaseous fuel to a cylinder of the engine, and an air-fuel ratio control means which controls the air-fuel ratio according to the operating condition of the engine, wherein said fuel supply means comprises a direct injection means which supplies the gaseous fuel directly into the cylinder and a pre-mixing supply means which supplies the gaseous fuel through an air intake passage, and there is provided a fuel supply characteristic control means which sets the proportion of the fuel supplied to the cylinder by the direct injection means to 100% when the air-fuel ratio set by the air-fuel ratio control means is in the range where NOx production is maximized and decreases the same as the air-fuel ratio set by the air-fuel ratio control means increases when it is leaner than the range where NOx production is maximized.

* * * * *